Feb. 24, 1942. L. R. BAKER 2,274,518

VEHICLE SUSPENSION

Filed Oct. 25, 1940

INVENTOR
Lee R. Baker.
BY
Harness, Dickey, Patell & Harris
ATTORNEYS

Patented Feb. 24, 1942

2,274,518

UNITED STATES PATENT OFFICE 2,274,518

VEHICLE SUSPENSION

Lee R. Baker, Birmingham, Mich., assignor to Chrysler Corporation, Highland Park, Mich., a corporation of Delaware Application October 25, 1940, Serial No. 362,719

3 Claims. (Cl. 267—52)

This invention relates to vehicle spring suspensions, particularly rear suspensions, for vehicles employing leaf springs as the suspension medium at the rear thereof.

During recent years the problem of providing passenger automobiles with improved riding qualities has received much attention and steady improvement has been effected, principally by lowering the spring rates and utilizing tires of low pressure. Because of the comparatively high cruising speeds of present day automobiles and the prevalence of paved roads, a major portion of the effort expended has been directed toward providing the car with an improved "boulevard ride." There are, however, many miles of unpaved highways which must still be driven over, and many vehicle suspensions which give entire satisfaction at high and low speeds on smooth roads are found wanting when the vehicle is driven over rough pavement, cobblestones, "washboard" gravel, and the like. When the vehicle is driven over such roads, the radiator ornament, instrument panel, door windows and other parts of the car are frequently subjected to vibration which is usually accompanied by jolting of the body and is very annoying to the passengers.

This phenomenon is referred to by automotive engineers as "shake," which term is generally used in the art to denote vibratory movements of a vehicle or parts thereof of a frequency of from two to fifteen cycles per second.

It has been determined after considerable research devoted to the subject that the principal cause of shake in an automobile resides in the rigid connection between the springs and the axle housing at the rear of the car which connections transmit the transverse vibratory movements of the axle directly to the frame.

The theory which suggested the presently described mode of attack on the problem of reducing shake arises from the geometry of the conventional rear suspension. In such a suspension, the leaf springs are shackled to the frame at one end and pivoted thereto at the other end and are rigidly tied to the axle housing. When one rear wheel rises in passing over a bump, the rear axle and wheels pivot about the point of contact of the undisturbed wheel with the ground. The spring seats on the axle travel on arcs which have considerable horizontal components. The horizontal displacements of the spring seats are, however, not quite equal, but both are of the order of ¼ inch for a bump 1 inch high and are in the same direction. The rear springs and tires are elastic, both under vertical and transverse forces, and as the mass of the car body and frame is large compared to that of the rear axle, the immediate effect of the bump is to produce small displacement of the body, greater displacement of the axle, and comparatively large elastic deflections of the springs and tires. These deflections, of course, involve the storage of energy in these members which will be returned in the form of rebound, and unless high damping is present, will be apparent as a vibration of the springs and attached masses. The low rate of the springs vertically, and the damping provided by the shock absorbers, control the vertical vibration satisfactorily but the transverse vibratory forces applied to the axle are substantially unchecked.

Applicant has found that the introduction of links between the axle and the springs, pivoting at either end about axes parallel with the center line of the vehicle, in effect, suspends the whole rear end of the vehicle as a pendulum and permits lateral movement of the body and springs relative to the axle and wheels.

Thus, under the bump conditions described above, the transverse motion of the axle is taken up by swinging of the links, and the failure of the body to follow the axle produces negligible energy storage in the springs and tires. The impressive reduction in shake experienced with the use of my invention (in the order of 60% at the radiator ornament and rear window and 12% to 15% at the instrument panel) must then be attributed to the great reduction in the aforesaid vibratory forces.

Accordingly, it is the principal object of the invention to effect a reduction in the shake tendency of an automotive vehicle by simple, effective and economical means.

Another object is to provide improved means for connecting the rear springs of a vehicle to the axle thereof which reduces the transverse vibratory forces transmitted to the body.

An additional object is to provide improved means for attaching the rear axle of a vehicle to the springs thereof whereby the body of the vehicle is suspended for lateral pendulum movement relative to the axle.

Further objects and advantages of the invention will become apparent from the following description which is directed to a preferred form of the device.

In the drawing which accompanies the following specification,

Figure 1:
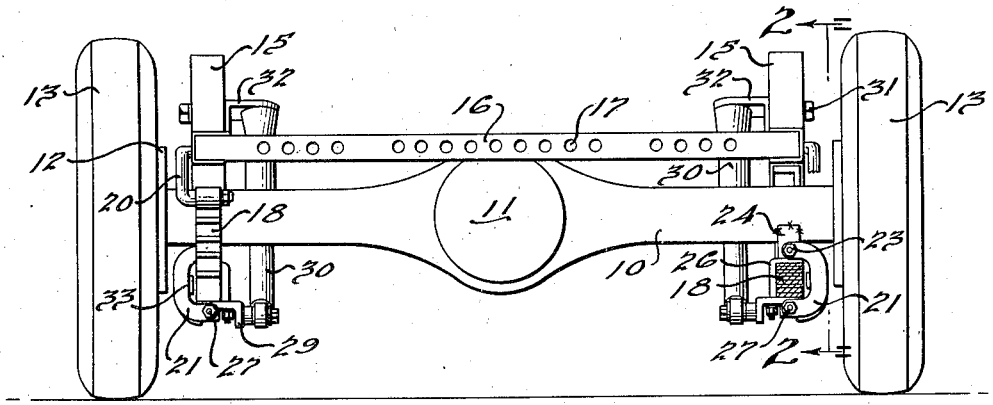
Fig. 1 is a rear elevation of a vehicle chassis showing the essential parts of my novel axle suspension.
Figure 2:
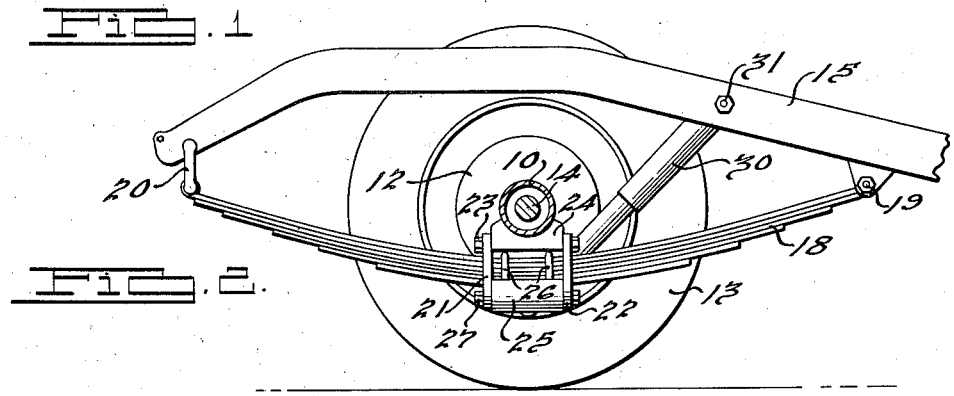
Fig. 2 is a sectional elevational view taken along the line 2—2 of Fig. 1.
Figure 3:
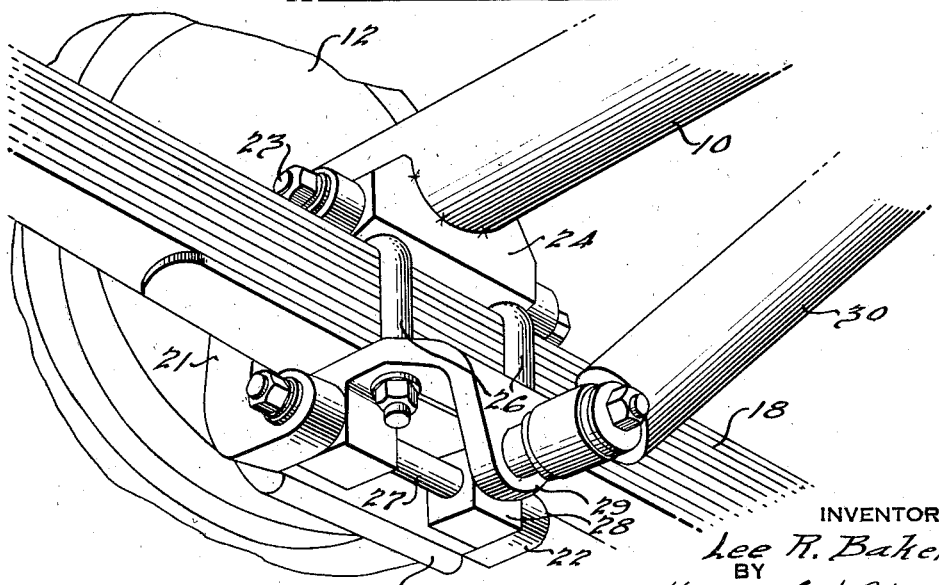
Fig. 3 is a perspective view of the left rear suspension unit at the vicinity of the wheel mounting.

In the drawing in which reference numerals designate corresponding parts referred to herein, the rear drive axle 10 of the vehicle is provided with the usual differential housing 11 and brake structures 12. The drive wheels 13 are mounted on the axle in the usual manner and are adapted to be driven from the differential gearing by axle shafts 14.

The chassis side sills 15 are connected by a structural brace member 16 which has holes 17 punched therein for lightness.

A pair of leaf springs 18 are pivoted to the side sills at their front ends by pivot bolts 19 and are shackled to the sills at their ends by the shackle links 20.

The springs are each connected to the axle housing 10 at points adjacent each end thereof by a pair of swinging links designated 21 and 22. These links are of substantially U-shape and of forged construction or the equivalent. They are pivotally attached to the axle housing by means of a bolt 23, the intermediate portion of which is carried by a lug 24 welded on to the axle housing.

The lower legs of the links 21 are pivotally attached to the springs 18 through the intermediary of a bracket 25 of forged or equivalent construction which is rigidly clamped to the spring at approximately the center thereof by a pair of U-bolts 26. A bolt 27 passes through a pair of lugs 28 formed on the bottom of the bracket 25 and the links 21, 22 respectively for providing a pivotal connection therebetween.

The bracket 25 is also provided with an integral ear 29 to which is pivotally attached the lower end of a telescoping shock absorber 30, the upper end thereof being pivoted at 31 to the side sill through a bracket 32.

From the description, it may be seen that I have provided a construction wherein the entire axle assembly including the wheels may swing laterally of the body and frame structure. The amount of swing is of course limited by the clearance between the springs 18 and the inner portions of the links 21—22. If desired a rubber pad such as that designated 33 in Fig. 1 may be used to limit the swing of the axle and to minimize noise.

Having thus described a specific embodiment of my invention, I wish to point out that, by so doing, I do not intend to limit the invention in the broader aspects thereof except as defined in the claims appended below.

I claim:

1. In a vehicle spring suspension, a frame; an axle; a pair of leaf springs respectively pivoted to said frame at one end thereof and shackled thereto at the other end thereof; means for connecting the central portions of said springs to said axle at points adjacent the ends thereof for accommodating lateral swinging of said axle relatively to said springs comprising a pair of links pivoted respectively to said axle and to said springs; the axes of said pivots lying in a common vertical plane disposed longitudinally of said frame.

2. In a vehicle spring suspension, a frame; an axle; a pair of leaf springs respectively pivoted to said frame at one end thereof and shackled thereto at the other end thereof; means for connecting the central portions of said springs to said axle at points adjacent the ends thereof for accommodating lateral swinging of said axle relatively to said springs comprising a pair of links pivoted respectively to said axle and to said springs on axes disposed longitudinally of said frame; and means for limiting said lateral swinging including a yieldable pad disposed between said respective links and springs.

3. In a vehicle spring suspension, a frame; an axle; a pair of leaf springs respectively pivoted to said frame at one end thereof and shackled thereto at the other end thereof; means for connecting the central portions of said springs to said axle at points adjacent the ends thereof for accommodating lateral swinging of said axle relatively to said springs comprising a pair of U-shaped links disposed in embracing relationship with said respective springs and having their respective legs pivoted to said axle and springs.

LEE R. BAKER.